(12) United States Patent
Kobayashi et al.

(10) Patent No.: US 12,504,933 B2
(45) Date of Patent: Dec. 23, 2025

(54) INFORMATION PROCESSING SYSTEM AND NON-TRANSITORY COMPUTER READABLE MEDIUM STORING PROGRAM

(71) Applicant: FUJIFILM Business Innovation Corp., Tokyo (JP)

(72) Inventors: Yuta Kobayashi, Kanagawa (JP); Naoto Yamasaki, Kanagawa (JP); Bo Liu, Kanagawa (JP); Yuka Sugiyama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 526 days.

(21) Appl. No.: 17/718,330

(22) Filed: Apr. 12, 2022

(65) Prior Publication Data

US 2023/0147520 A1 May 11, 2023

(30) Foreign Application Priority Data

Nov. 9, 2021 (JP) .................................. 2021-182384

(51) Int. Cl.
*G06F 3/12* (2006.01)
(52) U.S. Cl.
CPC .......... *G06F 3/1234* (2013.01); *G06F 3/1204* (2013.01); *G06F 3/1208* (2013.01); *G06F 3/1259* (2013.01); *G06F 3/12* (2013.01)
(58) Field of Classification Search
None
See application file for complete search history.

(56) References Cited

U.S. PATENT DOCUMENTS

| | | | |
|---|---|---|---|
| 10,332,057 B2 * | 6/2019 | Spencer | G06Q 10/0639 |
| 2013/0070289 A1 * | 3/2013 | Matsukawa | G06F 3/1208 |
| | | | 358/1.15 |
| 2016/0271881 A1 * | 9/2016 | Bostick | G05B 15/02 |
| 2016/0352976 A1 * | 12/2016 | Kuroiwa | G06K 15/1878 |
| 2021/0295240 A1 | 9/2021 | Hayakawa | |

FOREIGN PATENT DOCUMENTS

| | | |
|---|---|---|
| JP | 2013011942 | 1/2013 |
| JP | 6000804 | 10/2016 |
| JP | 2020204897 | 12/2020 |
| JP | 2021149874 | 9/2021 |

OTHER PUBLICATIONS

"Office Action of Japan Counterpart Application", issued on May 13, 2025, with English translation thereof, p. 1-p. 15.
"Decision of Refusal of Japan Counterpart Application", issued on Oct. 28, 2025, with English translation thereof, pp. 1-5.

* cited by examiner

*Primary Examiner* — Darryl V Dottin
(74) *Attorney, Agent, or Firm* — JCIPRNET

(57) ABSTRACT

An information processing system includes a processor configured to: acquire work information that is information about work performed on a device that performs a process on a recording medium by a worker who performs the work on the device; acquire processing information that is information about the process; and determine a content of evaluation information that is information about evaluation of the work performed by the worker and is to be associated with the work information, based on the acquired processing information.

20 Claims, 9 Drawing Sheets

INFORMATION PROCESSING SYSTEM AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2021-182384 filed Nov. 9, 2021.

BACKGROUND

(i) Technical Field

The present invention relates to an information processing system and a non-transitory computer readable medium storing a program.

(ii) Related Art

JP2020-204897A discloses a process of predicting the success or failure of execution, based on success/failure prediction conditions for predicting success/failure of execution and the recorded success/failure information, and in a case where the failure is predicted, providing a notification of the prediction of failure of a designated series of processing procedures.

JP6000804B discloses a work procedure management system that presents work procedures to workers and outputs information for displaying a procedure screen showing the contents of the procedure to be executed next.

SUMMARY

In a case where the work performed by the worker is evaluated and the work is associated with evaluation information, more information can be obtained, for example, in a case of referring to the information about this work later.

Here, in associating the evaluation information with the work, in a case where the work is manually evaluated and the evaluation information is associated, the workload required for this association increases.

Aspects of non-limiting embodiments of the present disclosure relate to an information processing system and a non-transitory computer readable medium storing a program that reduce the workload in a case of associating the evaluation information with the work performed by the worker, as compared with the case where the work is manually evaluated and the evaluation information is associated with the work.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including a processor configured to: acquire work information that is information about work performed on a device that performs a process on a recording medium by a worker who performs the work on the device; acquire processing information that is information about the process; and determine a content of evaluation information that is information about evaluation of the work performed by the worker and is to be associated with the work information, based on the acquired processing information.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the accompanying drawings.

Figure 1:
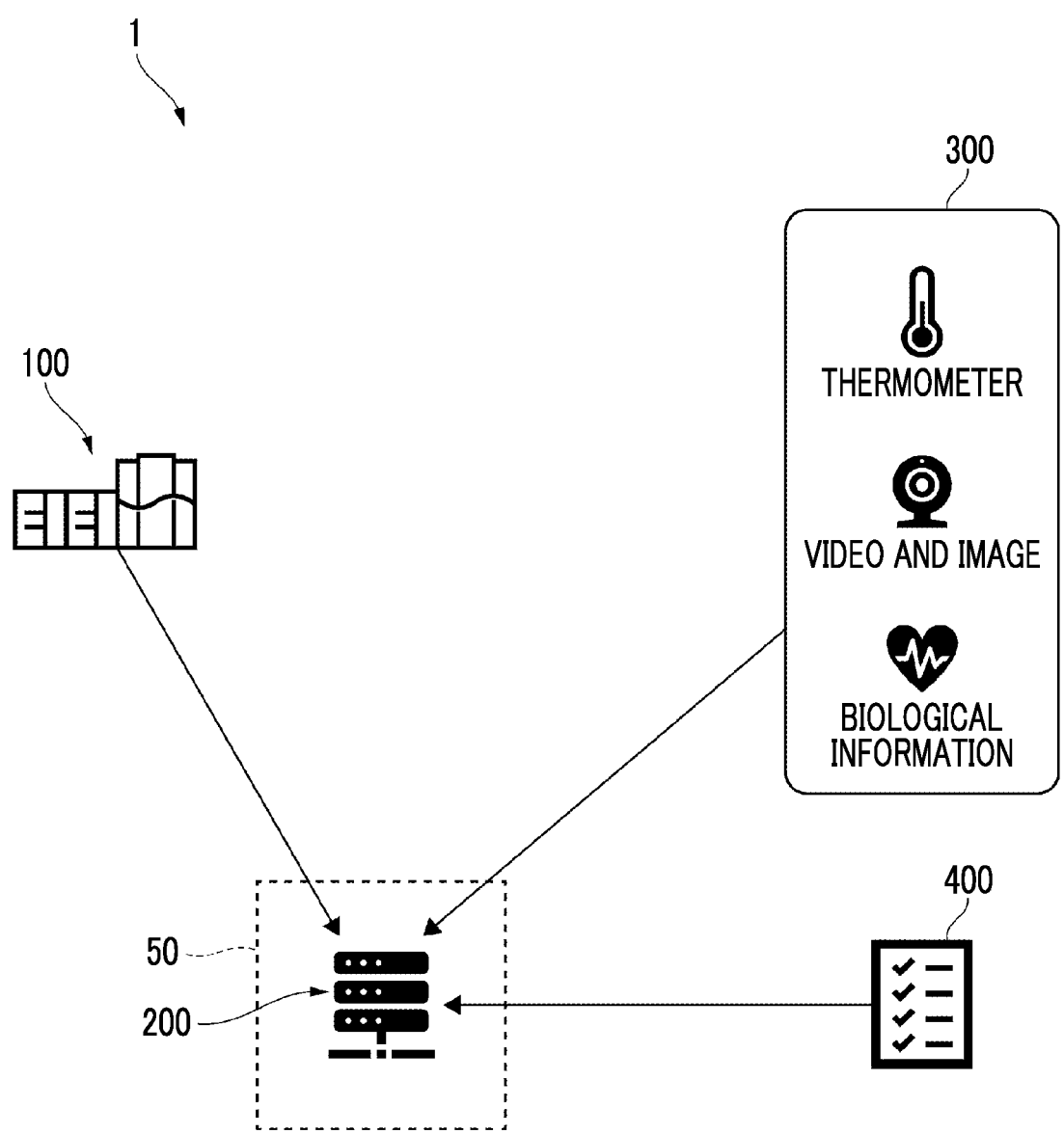
FIG. 1 is a diagram showing a printing system.

FIG. 1 is a diagram showing a printing system 1 according to the present exemplary embodiment.

The printing system 1 of the present exemplary embodiment is provided with a printing device 100, a management server 200, an information acquisition device 300, and an inspection device 400.

The printing device 100 is an example of a device that performs a process on a recording medium such as paper, and performs printing on the recording medium. The printing device 100 includes a printing mechanism, and performs printing on a recording medium, by using a method such as an electrophotographic method or an inkjet method.

The management server 200 as an example of the information processing device acquires information from the printing device 100, the information acquisition device 300, and the inspection device 400. Then, the management server 200 determines, based on the acquired information, the content of evaluation information (details will be described later) associated with the work information which is the information about the work performed by the worker on the printing device 100.

In the present exemplary embodiment, an information processing system 50 that associates corresponding evaluation information with work information is provided. In the present exemplary embodiment, the management server 200 provided as a part of the information processing system 50 associates corresponding evaluation information with work information.

The association between corresponding evaluation information and work information may be performed not only by the management server 200, but also by a device other than the management server 200. For example, the association may be performed by an information processing unit provided in the printing device 100.

The information acquisition device 300 includes a camera described later, an environment sensor that acquires environment information such as temperature and humidity, a microphone that acquires voice emitted by a worker or the like, and a biosensor that acquires biological information such as a pulse of a worker or the like.

The inspection device 400 inspects the printed matter as an example of an output produced by the printing device 100. The inspection device 400 includes, for example, a scanner device that reads an image on a printed recording medium that constitutes the printed matter. The inspection device 400 determines the quality of the printed matter, based on the scanned image obtained by the scanner device.

The inspection device 400 may be incorporated in the printing device 100 as a part of the printing device 100. Further, the inspection device 400 may be incorporated in a processing device described later.

Figure 2:
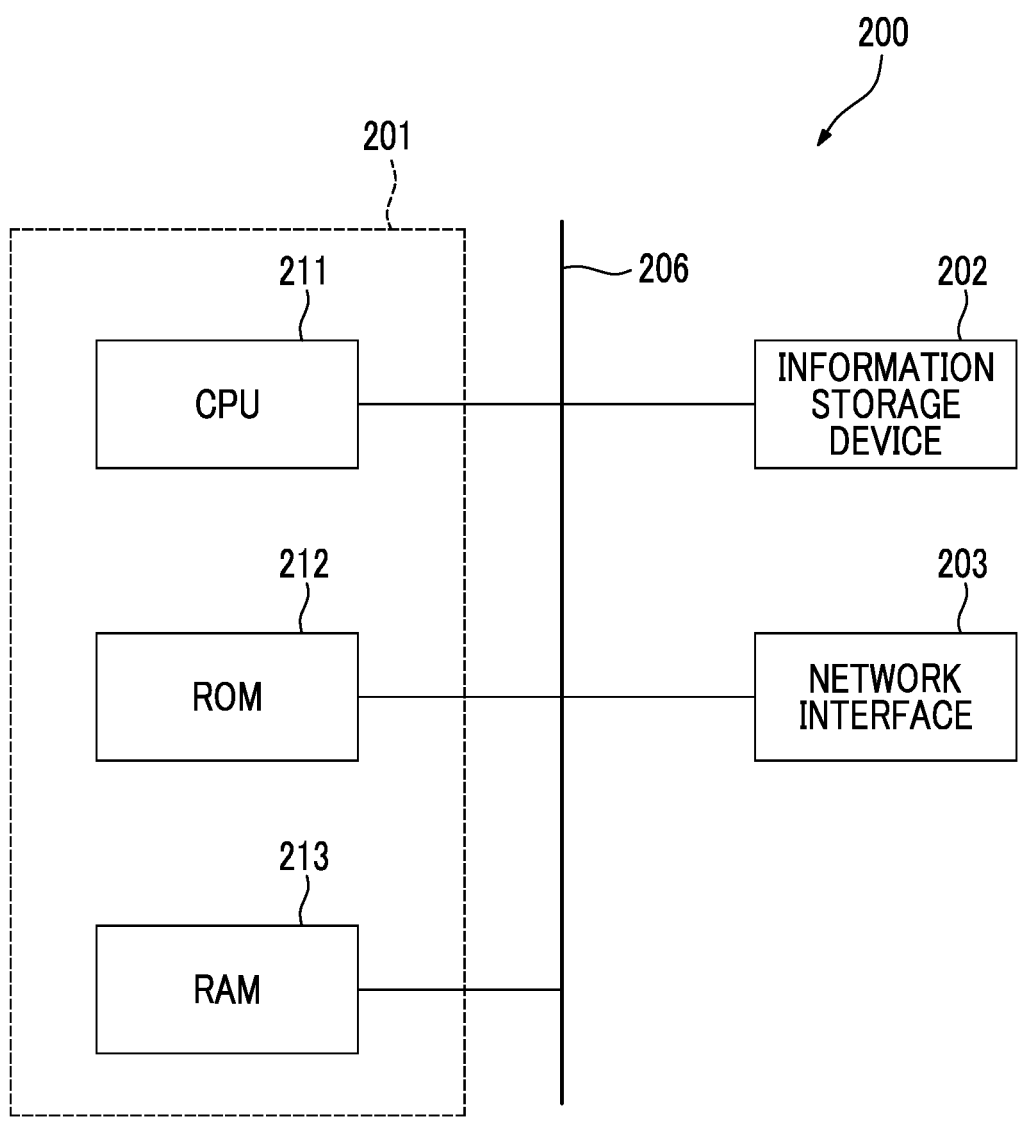
FIG. 2 is a diagram showing an example of a hardware configuration of a management server.

FIG. 2 is a diagram showing an example of the hardware configuration of the management server 200.

The management server 200 is provided with an information processing unit 201, an information storage device 202 that stores information, and a network interface 203 that achieves communication via a local area network (LAN) cable or the like.

The information processing unit 201 is composed of a computer.

The information processing unit 201 has a central processing unit (CPU) 211 as an example of a processor that executes various processes described later. Further, the information processing unit 201 has a read only memory (ROM) 212 in which software is stored, and a random access memory (RAM) 213 used as a work area.

The information storage device 202 is existing devices such as a hard disk drive, a semiconductor memory, and a magnetic tape.

The information processing unit 201, the information storage device 202, and the network interface 203 are connected to each other via a bus 206 or a signal line (not illustrated).

The program to be executed by the CPU 211 can be provided to the management server 200 by being stored in a computer readable recording medium such as a magnetic recording medium (a magnetic tape, a magnetic disk, etc.), an optical recording medium (optical disk, etc.), an optical magnetic recording medium, or a semiconductor memory. Further, the program to be executed by the CPU 211 may be provided to the management server 200 by using a communication means such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Example of Process

Figure 3:
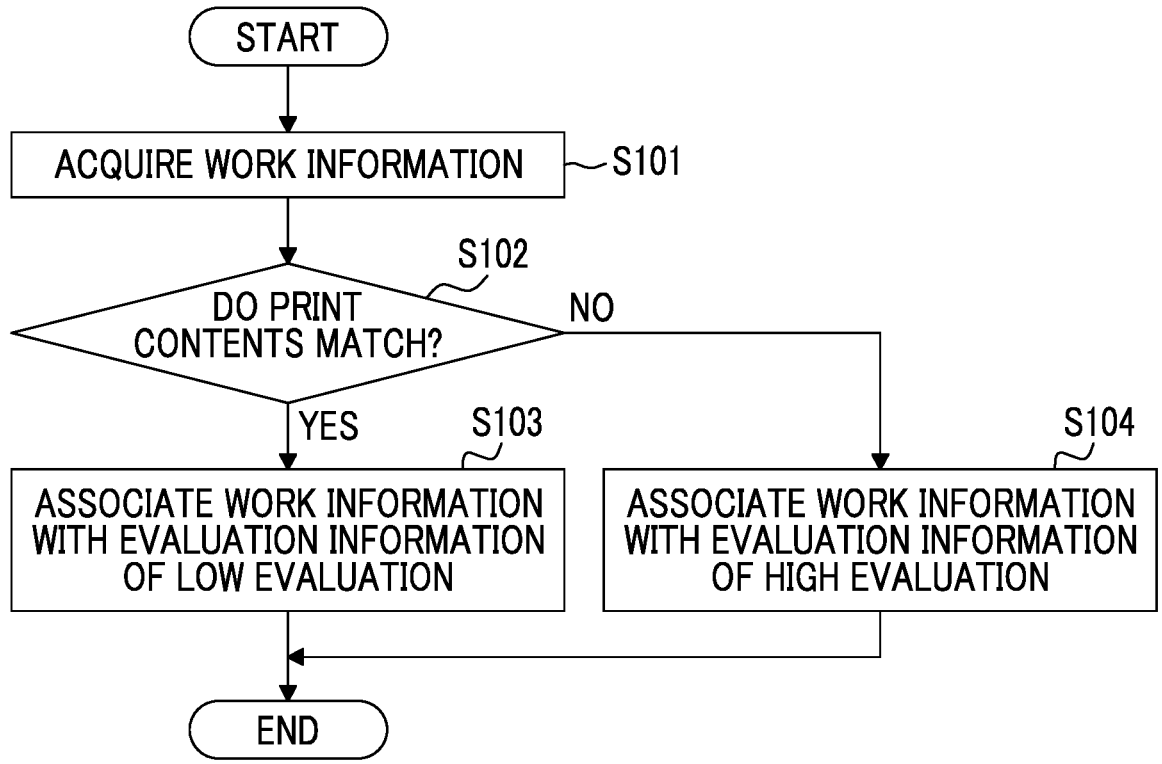
FIG. 3 is a flowchart showing an example of a flow of a process executed in the printing system.

FIG. 3 is a flowchart showing an example of a flow of a process executed in a printing system 1 of the present exemplary embodiment.

In the present exemplary embodiment, prior to printing in the printing device 100, a worker performs work related to this printing. Specifically, in this processing example, the worker performs work on the printing device 100. More specifically, the worker performs the work of preparing for printing to be performed.

Note that this work is not limited to the work that directly touches the printing device 100, and this work also includes work that does not directly touch the printing device 100, such as an operation on a personal computer (PC) connected to the printing device 100.

As work, for example, the worker sets a sheet of paper, which is an example of a recording medium, in the printing device 100, and inputs various set values such as the number of printed sheets and printing conditions.

Further, as work, for example, the worker performs an operation on the mechanical unit of the printing device 100, such as adjustment of various mechanical units of the printing device 100.

In the present exemplary embodiment, the CPU 211 of the management server 200 acquires work information which is information about this work performed by the worker regarding printing (step S101).

Specifically, this work information is output from the printing device 100, a PC connected to the printing device 100, an information acquisition device 300, or the like.

The CPU 211 of the management server 200 acquires the work information output from the printing device 100, the PC, the information acquisition device 300, or the like.

The work performed by the worker is not limited to before printing, but may be performed during printing. In a case where the worker also performs work during printing, the CPU 211 of the management server 200 also acquires information about the work performed by the worker during printing.

Every time the CPU 211 of the management server 200 acquires the work information, the CPU 211 registers the work information in the information storage device 202 (see FIG. 2). Specifically, the CPU 211 of the management server 200 registers the work information in the information storage device 202 in a state of being associated with the print job of printing performed by the printing device 100.

In the present exemplary embodiment, every time the work information is acquired, the work information and the print job are registered in the information storage device 202 in a state of being associated with each other.

A process of acquiring work information by the CPU 211 of the management server 200 will be described.

The CPU 211 of the management server 200 acquires information output from the information acquisition device 300 such as a camera, for example, and acquires work information.

In the present exemplary embodiment, the room where the printing device 100 is installed is provided with a surveillance camera as an example of the information acquisition device 300 for acquiring a video of the printing device 100 and a worker.

Further, in the present exemplary embodiment, the worker wears a wearable-type camera (hereinafter referred to as "wearable camera") as another example of the information acquisition device 300 on his/her head.

More specifically, the worker wears glasses or a head mount display on his or her head, and the glasses or head mount display is provided with a wearable camera for imaging the surroundings of the worker.

Further, in the present exemplary embodiment, the glasses or the head mount display is provided with a microphone as another example of the information acquisition device 300. This microphone acquires the voice of the worker and the sound around the worker.

Further, in the present exemplary embodiment, a biosensor is provided as another example of the information acquisition device 300. This biosensor is incorporated in, for example, a wristwatch of the worker, and acquires biological information such as a pulse of the worker.

Further, in the present exemplary embodiment, the set value input by the worker is output from the device to which the set value is input. Specifically, in a case where the set value is input to the printing device 100, the set value is output from the printing device 100, and in a case where the set value is input to another device such as a PC, the set value is output from the other device.

Further, in the present exemplary embodiment, operation information, which is information about the operation performed by the worker on the printing device 100, is output from the printing device 100. In other words, in the present exemplary embodiment, the information about the operation log is acquired by the printing device 100, and the operation log is output from the printing device 100.

The CPU 211 of the management server 200 acquires these types of information as work information which is information about the work performed by the worker regarding printing.

That is, the CPU 211 of the management server 200 acquires, as the work information, videos acquired by the surveillance camera, videos acquired by the wearable camera, set values input by the worker to the printing device 100 and other devices, and the operation information, which is the information about the operation performed by the worker on the printing device 100.

More specifically, in the present exemplary embodiment, the CPU 211 of the management server 200 specifies the start and end of the work performed by the worker regarding printing, by analyzing the video acquired by, for example, a surveillance camera or a wearable camera.

Specifically, the CPU 211 of the management server 200 sets a time when the worker performs a predetermined operation as a start, and a time when the worker performs a predetermined operation as an end to specify the start and end of the operation.

Then, the CPU 211 of the management server 200 acquires, as work information, the information acquired between the start and the end, from among the various types of acquired information.

The start and end of the work are not limited to being specified based on the analysis of the video, but may be specified based on the information input by the worker.

For example, the worker may be caused to input information indicating the start of the work and information indicating the end of the work to the printing device 100 or the operation terminal device owned by the worker, and the start and end of the work performed by the worker regarding printing may be specified based on the information.

After that, in the present exemplary embodiment, the printing process is started by the printing device 100.

The CPU 211 of the management server 200 acquires processing information which is information about this printing process.

Specifically, the CPU 211 of the management server 200 acquires information about the print content, which is the print content, as the processing information. More specifically, the CPU 211 of the management server 200 acquires information about the print content, based on information on this print job input to the printing device 100.

The print job includes information such as image data that is the source of printing, printing conditions used for printing, and the number of copies to be printed, and the CPU 211 of the management server 200 acquires these types of information as processing information.

Further, the CPU 211 of the management server 200 acquires information about the print contents of the printing performed immediately before the current printing. Specifically, the CPU 211 of the management server 200 acquires information about the print content, based on the information on the print job of the printing performed immediately before.

In the present exemplary embodiment, every time printing is performed, information about the print job of this printing is registered in the information storage device 202 of the management server 200.

The CPU 211 of the management server 200 reads the information on the print job of the printing performed immediately before, from the information storage device 202, and acquires information about the print contents of the printing performed immediately before, based on the information on this print job.

After that, the CPU 211 of the management server 200 compares the print content of the current printing with the print content of the immediately-before printing, and determines whether the print content of the current printing matches the print content of the immediately-before printing (step S102).

In other words, the CPU 211 of the management server 200 compares the processing information which is the information about the printing process to be performed this time with the processing information which is the information about the printing process immediately before the current printing process.

In other words, the CPU 211 of the management server 200 compares the content of the immediately-before pre-printing, which is the printing performed earlier, and the content of the post-printing, which is the printing to be performed this time and is the printing performed after the pre-printing.

More specifically, the CPU 211 of the management server 200 determines whether or not the content of the immediately-before printing is similar to the content of the printing to be performed this time, based on the information on the print job of the current printing and the information on the print job of the immediately-before printing.

Specifically, the CPU 211 of the management server 200 obtains the similarity between the content of the immediately-before printing and the content of the printing to be performed this time, and then determines whether or not the similarity exceeds the predetermined similarity (threshold).

Here, with respect to similarity, for example, for each of various types of information included in the print job, information is compared, and the similarity is grasped for each piece of information. Then, for example, the average value of the plurality of similarities to be grasped is grasped as the final similarity.

Specifically, for example, a print job includes information such as image data, various printing conditions, and the number of copies to be printed, and the similarity is grasped for each information by comparing information, for each of these types of included information. Then, the average value of the plurality of similarities to be grasped is grasped as the final similarity.

Then, in a case where the grasped similarity exceeds the predetermined similarity, the CPU 211 of the management server 200 associates the work information about the work performed by the worker for the pre-printing with evaluation information indicating that the evaluation is low.

In other words, in a case where the print content of the current printing and the print content of the immediately-before printing match, the CPU 211 of the management server 200 associates the work information about the work performed by the worker for the pre-printing with the evaluation information indicating that evaluation is low (step S103).

Specifically, the CPU 211 of the management server 200 associates the work information for the pre-printing, which is the immediately-before printing, with the evaluation information indicating that evaluation is lower than the evaluation information to be associated in a case where the grasped similarity does not exceed a predetermined similarity.

More specifically, in this case, the CPU 211 of the management server 200 associates the work information for the pre-printing with information indicating that the work performed by the worker for the pre-printing was a failed work (hereinafter, referred to "failure information").

On the other hand, in a case where the similarity does not exceed a predetermined similarity, the CPU 211 of the management server 200 associates the work information for the pre-printing with the evaluation information indicating that evaluation is higher than the evaluation information to be associated in a case where the similarity exceeds the predetermined similarity (step S104).

More specifically, in this case, the CPU 211 of the management server 200 associates the work information regarding the work performed by the worker for the pre-printing with information indicating that the work performed by the worker for the pre-printing is a successful work (hereinafter, referred to "success information").

Here, the "evaluation information" is information indicating the degree of quality of the work performed by the worker. The "evaluation information" is not limited to information on whether the work is successful or unsuccessful, and may be a numerical value or a symbol indicating the degree of success.

Further, the "evaluation information" is not limited to information for determining the success or failure of the work, and may be information indicating the possibility that the work is likely to be successful or unsuccessful. Further, the "evaluation information" may be a numerical value indicating the possibility of success or failure.

Further, the "evaluation information" is not limited to the absolute information indicating the evaluation, but may be relative information such as "good compared to" or "bad compared to".

Further, the "evaluation information" is not limited to information indicating good or bad, but may be information indicating normality.

In a case where the similarity between the content of the pre-printing and the content of the post-printing exceeds the predetermined similarity, it can be considered that the pre-printing has failed and the same content as the pre-printing has been printed as the post-printing. In other words, it can be considered that the same print job is performed a plurality of times.

The failure of the pre-printing may be caused by the work performed by the worker in a case of the pre-printing. In the present exemplary embodiment, the work information of the work performed in a case of the pre-printing is associated with failure information, as described above.

Then, in this case, in the present exemplary embodiment, in a state where the print job, the work information, and the failure information are registered in the information storage device 202 of the management server 200 in a state of being associated with each other.

On the other hand, in a case where the similarity between the content of the pre-printing and the content of the post-printing does not exceed the predetermined similarity, it can be considered that the pre-printing is successful and then the printing based on another print job is performed.

In this case, in the present exemplary embodiment, the work information of the work performed in a case of pre-printing is associated with the success information indicating that the pre-printing is successful.

Then, in this case, in the present exemplary embodiment, in a state where the print job, the work information, and the success information are registered in the information storage device 202 of the management server 200 in a state of being associated with each other.

In this processing example, the CPU 211 of the management server 200 acquires processing information which is information about the printing process performed by the printing device 100, as described above. Specifically, the CPU 211 of the management server 200 acquires, as processing information, information about the content of the pre-printing, which is the printing performed earlier, and the content of the post-printing, which is the printing performed later.

More specifically, the CPU 211 of the management server 200 acquires information about the contents of the pre-printing and the contents of the post-printing, based on the print job of the pre-printing and the print job of the post-printing.

In this processing example, the CPU 211 of the management server 200 determines the content of evaluation information that is information about evaluation of the work performed by the worker regarding printing and is to be associated with the work information, based on these types of acquired information.

Then, in a case where the CPU 211 of the management server 200 determines the content of the evaluation information, the CPU 211 associates the evaluation information which determines the content with the work information.

After the evaluation information is associated with the work information, for example, the administrator or the like may be notified of the evaluation information and the work information. Then, the administrator or the like may determine the evaluation information to be finally associated with the work information, by checking the evaluation information and the work information.

In the above, the similarity between the content of the pre-printing and the content of the post-printing is obtained, based on the information included in the print job of the pre-printing and the information included in the print job of the post-printing.

Incidentally, the acquisition of the similarity between the content of the pre-printing and the content of the post-printing is not limited to this, and may be based on, for example, the match or mismatch between the job ID of the pre-printing and the job ID of the post-printing.

In other words, the acquisition of the similarity between the content of the pre-printing and the content of the post-printing may be based on the match or mismatch of the identification information attached to each of the pre-printing and the post-printing.

In this case, in a case where the job ID of the pre-printing and the job ID of the post-printing match, the similarity between the content of the pre-printing and the content of the post-printing is set to, for example, 100%, and it is determined that the similarity exceeds the predetermined similarity.

Further, in a case where the job ID of the pre-printing and the job ID of the post-printing do not match, for example, the similarity is set to, for example, 100%, and it is not determined that the similarity exceeds the predetermined similarity.

In the printing device 100, in a case where an error or the like occurs in the work, the work may be redone or the printed matter may have to be discarded.

In order to suppress the occurrence of such defects, workers may create daily reports and work reports every day to accumulate cases, and based on these cases, measures to suppress the occurrence of defects may be taken.

However, creating daily reports and work reports is time-consuming, and measures to suppress the occurrence of defects may not be taken in many cases.

On the other hand, in the present exemplary embodiment, the work information is sequentially accumulated, and the evaluation information is associated with each of the work information.

Thus, the worker, the administrator, or the like can check what type of work error occurred in the past, for example, by referring to later the work information to which the evaluation information indicating the failure is attached.

In addition, an inexperienced worker can refer to the work of a skilled worker by referring to the work information to which the evaluation information indicating the success is attached.

Further, as in the present exemplary embodiment, in a case where the work information and the evaluation information are accumulated, a notification process is performed for the worker who performs a new work.

Specifically, for example, in a case where new works are started by a worker, every time the worker performs one work included in the new works, the worker is notified of the quality of this one work.

Specifically, for example, it is possible to determine the quality of this one work to be newly performed by the worker, by comparing the one work to be newly performed by the worker with one work included in the work information that is registered in the information storage device 202 and is associated with evaluation information indicating success.

Then, in this case, in a case where the worker is notified of the result of the determination of the quality, the worker knows the quality of the one work.

In the present exemplary embodiment, the process in a case where the worker performs the work on the printing device 100 will be described as an example, but the device to which the process of the present exemplary embodiment is applied is not limited to the printing device 100.

The process of the present exemplary embodiment may be applied to a processing device that performs a processing process on a recording medium such as paper, such as drilling, a binding process, and a folding process.

Even in the processing device that performs a processing process on a recording medium, the recording medium is set and various set values such as the number of sheets to be processed and the processing conditions are input. Further, even in this processing device, the worker performs an operation on the mechanical unit of the processing device, such as adjusting various mechanical units of the processing device. Further, in the processing device, the worker may manually perform works such as covering for manufacturing a bookbinding or inserting a booklet.

In the present exemplary embodiment, evaluation information is associated with work information about work on this processing device.

Other Processing Examples

Figure 4:
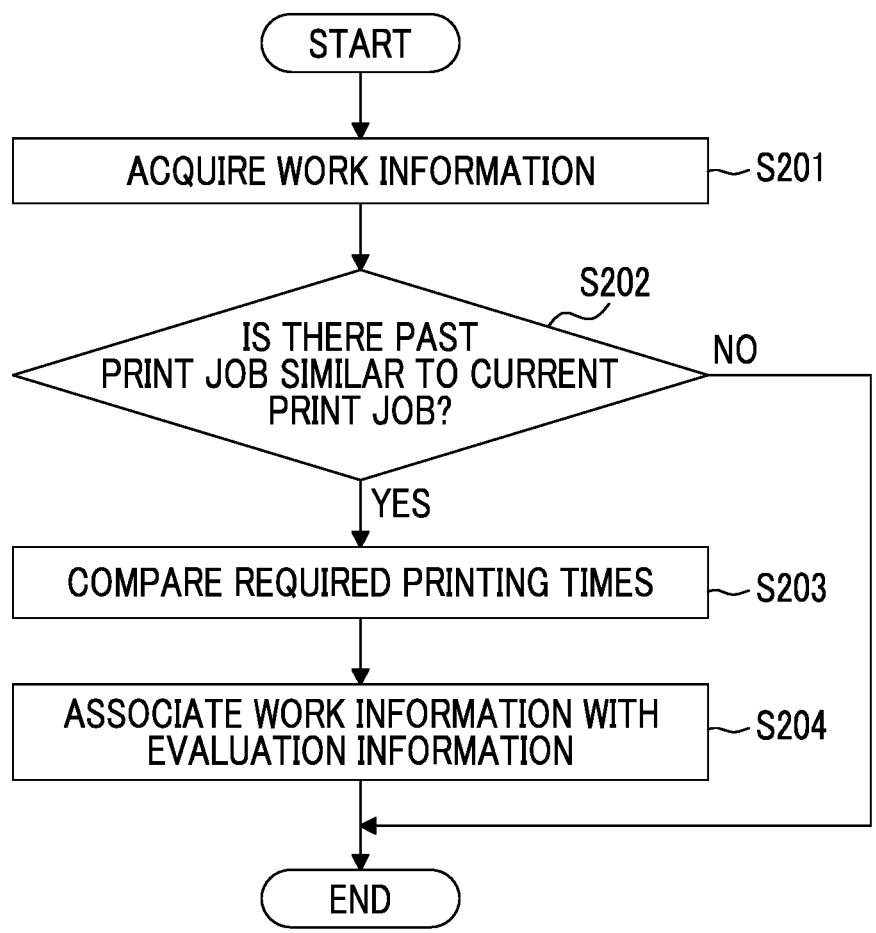
FIG. 4 is a flowchart showing an example of a flow of another process executed in the printing system.

FIG. 4 is a flowchart showing an example of a flow of another process executed in the printing system 1 of the present exemplary embodiment.

Even in this process, the worker first performs the work related to printing.

Then, even in this processing example, as in the above, the CPU 211 of the management server 200 acquires work information which is information about this work performed by the worker regarding printing (step S201).

After that, in this processing example, printing is performed by the printing device 100.

Then, in this processing example, in a case where printing is completed by the printing device 100, the CPU 211 of the management server 200 acquires a time required for this printing (hereinafter, referred to as "required printing time"). The "required printing time" refers to the time from the start of the above work by the worker to the completion of the printed matter.

Here, in the present exemplary embodiment, the CPU 211 of the management server 200 specifies the start of the required printing time by analyzing the video acquired by, for example, a surveillance camera or a wearable camera.

Further, the CPU 211 of the management server 200 specifies the end of the required printing time by, for example, analyzing the information output from the printing device 100.

Then, the CPU 211 of the management server 200 acquires the required printing time, based on the specified start and end.

In this exemplary embodiment, a process of acquiring a required printing time is performed for each print job, and the print job and the required printing time are associated with each other, for each print job. Then, the print job and the required printing time which are associated with each other are registered in the information storage device 202 of the management server 200.

Next, in this processing example, the CPU 211 of the management server 200 acquires processing information which is information about the printing process to be performed this time. Specifically, as the processing information, for example, as in the above, the information about the print job of the current printing is acquired.

Next, the CPU 211 of the management server 200 determines whether or not there is a past print job similar to the current print job (step S202).

Specifically, the CPU 211 of the management server 200 determines whether or not there is a past print job similar to the current print job, based on the content of the current print job and the content of the past print job registered in the information storage device 202.

Then, in a case where there is a past print job similar to the contents of the current print job, the CPU 211 of the management server 200 grasps the required printing time associated with the past print job.

In this processing example, as described above, every time printing is performed, the print job and the required printing time in a case where printing based on this print job is performed, which are associated with each other, are registered in the information storage device 202 of the management server 200.

Then, in a case where there was a past print job similar to the contents of the current print job, the CPU 211 of the management server 200 grasps the required printing time associated with the past print job, with reference to the information storage device 202.

In other words, in a case where there was a past print job of which a similarity with the contents of the current print job exceeds a predetermined similarity, the CPU 211 of the management server 200 grasps the required printing time associated with the past print job, with reference to the information storage device 202.

Then, the CPU 211 of the management server 200 compares the required printing time for the current printing with the required printing time for the past-printing (step S203).

Next, the CPU 211 of the management server 200 associates the evaluation information with the work information, based on the result of this comparison (step S204).

Specifically, in a case where the required printing time for the current printing (hereinafter referred to as "current required time") is longer than the required printing time for the past-printing (hereinafter referred to as "past required time"), the CPU 211 of the management server 200 associates evaluation information indicating that the evaluation is low with the work information about the work performed by the worker for the current printing.

More specifically, in this case, the CPU 211 of the management server 200 associates the work information with evaluation information indicating that the evaluation is lower than the evaluation information to be associated in the case where the current required time is shorter than the past required time.

Further, in the case where the current required time is shorter than the past required time, the CPU 211 of the management server 200 associates the work information about the work performed by the worker for the current printing with evaluation information indicating that the evaluation is high.

More specifically, the CPU 211 of the management server 200 associates the work information with evaluation information indicating that the evaluation is higher than the evaluation information to be associated in the case where the current required time is longer than the past required time.

Even in this processing example, the CPU 211 of the management server 200 acquires information about the pre-printing, which is the printing process performed earlier, and information about the post-printing, which is the printing process performed later, as the processing information.

Then, the CPU 211 of the management server 200 determines the content of the evaluation information to be associated with the work information about the work performed by the worker for the post-printing, based on the time required for the pre-printing and the time required for the post-printing.

Then, in the above, the content of the evaluation information to be associated with the work information about the work performed by the worker for the post-printing is determined, based on the time required for the pre-printing and the time required for the post-printing.

Not limited to this, the content of the evaluation information to be associated with the work information about the work performed by the worker for the pre-printing may be determined, based on the time required for the pre-printing and the time required for the post-printing.

In this case, in a case where the time required for the pre-printing is shorter than the time required for the post-printing, evaluation information indicating that the evaluation is high is associated with the work information about the work performed by the worker for pre-printing.

Further, in a case where the time required for the pre-printing is longer than the time required for the post-printing, evaluation information indicating that the evaluation is low is associated with the work information about the work performed by the worker for pre-printing.

Other Processing Examples

Figure 5:
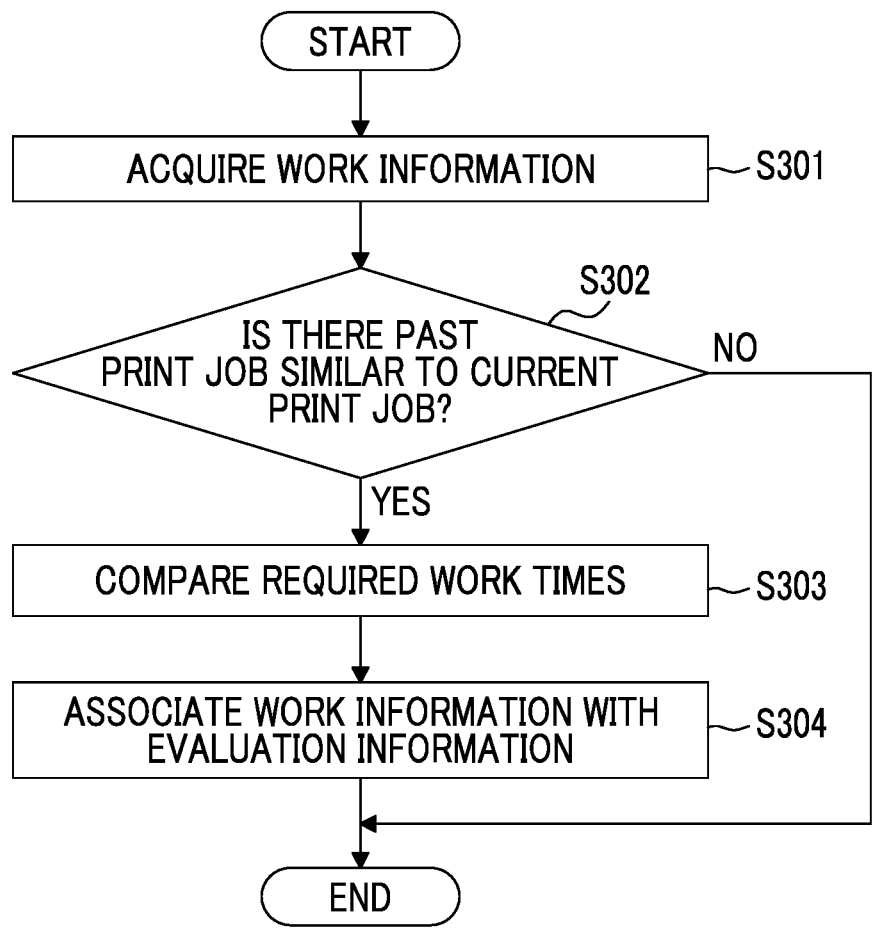
FIG. 5 is a flowchart showing an example of a flow of another process executed in the printing system.

FIG. 5 is a flowchart showing an example of a flow of another process executed in the printing system 1 of the present exemplary embodiment.

Even in this processing example, the worker first performs the work related to printing. In other words, the worker operates the printing device 100.

Then, even in this processing example, as in the above, the CPU 211 of the management server 200 acquires work information which is information about this work performed by the worker regarding printing (step S301).

Further, in this processing example, the CPU 211 of the management server 200 acquires a required work time, which is a time required for this work performed by the worker regarding printing.

Specifically, in this case, the CPU 211 of the management server 200 specifies the start and end of this work performed by the worker regarding printing, by analyzing the video acquired by, for example, a surveillance camera or a wearable camera, and acquires the required work time, based on the start and end.

As in the above, the specification of the start and end of this work performed by the worker regarding printing is not limited to the analysis of the video, and may be performed based on the information input by the worker.

For example, the worker may be caused to input information indicating the start of the work and information indicating the end of the work to the printing device 100 or the operation terminal device owned by the worker, and the start and end of the work performed by the worker regarding printing may be specified based on the information.

Further, even in this processing example, as in the above, a process of acquiring a required work time is performed for each print job, and the print job and the required work time are associated with each other, for each print job. Then, the print job and the required work time which are associated with each other are registered in the information storage device 202 of the management server 200.

After that, in this processing example, printing is performed by the printing device 100.

Further, in this processing example, the CPU 211 of the management server 200 acquires processing information which is information about this printing process this time. Specifically, the CPU 211 of the management server 200 acquires, for example, the contents of a print job, as processing information, as in the above.

Next, the CPU 211 of the management server 200 determines whether or not there is a past print job similar to the current print job (step S302).

Specifically, as in the above, the CPU 211 of the management server 200 determines whether the past print job similar to the current print job is registered in the information storage device 202.

In other words, the CPU 211 of the management server 200 determines whether or not there is a past print job similar to the current print job, based on similarity between the content of the current print job and the content of the past print job registered in the information storage device 202.

Then, in a case where there is a past print job similar to the contents of the current print job, the CPU 211 of the management server 200 grasps the required work time associated with the past print job.

Specifically, in a case where there is a past print job of which similarity exceeds a predetermined similarity, the CPU 211 of the management server 200 grasps the required work time associated with the past print job.

In this processing example, as described above, every time printing is performed, the print job and the required work time in a case where printing based on this print job is performed, which are associated with each other, are registered in the information storage device 202 of the management server 200.

In a case where there was a past print job similar to the contents of the current print job, the CPU 211 of the management server 200 grasps the required work time associated with the past print job, with reference to the information storage device 202.

Then, the CPU 211 of the management server 200 compares the required work time for the current printing (hereinafter referred to as "current work time") with the required work time for the past-printing (hereinafter referred to as "past work time") (step S303).

Next, the CPU 211 of the management server 200 associates the evaluation information with the work information, based on the result of this comparison (step S304).

Specifically, in the case where the current work time is shorter than the past work time, the CPU 211 of the management server 200 associates the work information about the work performed by the worker for the current printing with evaluation information indicating that the evaluation is high.

More specifically, the CPU 211 of the management server 200 associates the work information with evaluation information indicating that the evaluation is higher than the evaluation information to be associated in the case where the current work time is longer than the past work time.

On the other hand, in the case where the current work time is longer than the past work time, the CPU 211 of the management server 200 associates the work information about the work performed by the worker for the current printing with evaluation information indicating that the evaluation is low.

More specifically, the CPU 211 of the management server 200 associates the work information with evaluation information indicating that the evaluation is lower than the evaluation information to be associated in the case where the current work time is shorter than the past work time.

Here, the case where the evaluation information is associated with the work information about the work performed by the worker for post-printing has been described.

Without being limited to this, as in the above, evaluation information may be associated with the work information about the work performed by the worker for the pre-printing, based on the current work time for the current printing and the past work time for the past-printing.

In this case, in a case where the past work time, which is the required work time for pre-printing, is shorter than the current work time, which is the required work time for post-printing, the work information about the work performed by the worker for the pre-printing is associated with the evaluation information indicating that the evaluation is high.

Further, in a case where the past work time, which is the required work time for pre-printing, is longer than the current work time, which is the required work time for post-printing, the work information about the work performed by the worker for the pre-printing is associated with the evaluation information indicating that the evaluation is low.

Even in this processing example, it is determined whether or not the content of the pre-printing which is the printing performed earlier is similar to the content of the post-printing, which is the printing to be performed this time and the printing to be performed later.

In other words, the CPU 211 of the management server 200 determines whether or not the content of the pre-printing which is the printing performed earlier is similar to the content of the post-printing, which is the printing to be performed this time and the printing to be performed later.

More specifically, the CPU 211 of the management server 200 obtains the similarity between the content of the pre-printing which is the printing performed earlier and the content of the post-printing, which is the printing to be performed this time and the printing to be performed later.

More specifically, in a case where there are a plurality of pieces of information about the pre-printing, the CPU 211 of the management server 200 sequentially obtains the similarity between the content of each of the pre-printing and the content of the post-printing.

In a case where there is a pre-printing having contents of which a similarity with the contents of the post-printing exceeds a predetermined threshold, the CPU 211 of the management server 200 acquires the required work time associated with the pre-printing.

Further, in a case where there is a plurality of pre-printings having contents of which a similarity with the contents of the post-printing exceeds a predetermined threshold, the CPU 211 of the management server 200 acquires the required work time of the latest pre-printing, for example.

Then, in a case where the required work time corresponding to the post-printing is longer than the required work time associated with the pre-printing, as described above, the CPU 211 of the management server 200 associates the work information about the work performed by the worker for the post-printing with the evaluation information indicating that the evaluation is low.

On the other hand, in a case where the required work time corresponding to the post-printing is shorter than the required work time associated with the pre-printing, the CPU 211 of the management server 200 associates the work information about the work performed by the worker for the post-printing with the evaluation information indicating that the evaluation is high.

Other Processing Examples

In addition, in a case where the CPU 211 of the management server 200 acquires the required printing time, which is the time required for printing, as described above, the CPU 211 may determine the content of the evaluation information to be associated with the work information about the work performed by the worker for this printing, only based on the one required printing time.

In the above, the content of the evaluation information to be associated with the work information is determined based on the comparison of the two required printing times, but the content of the evaluation information to be associated with the work information about the work performed by the worker may be determined based on one required printing time.

More specifically, in this case, in a case where one required printing time for the current printing is smaller than a predetermined threshold, the CPU 211 of the management server 200 associates the work information with evaluation information indicating that evaluation is high.

Further, in a case where the one required printing time for the current printing is larger than a predetermined threshold, the CPU 211 of the management server 200 associates the work information with evaluation information indicating that evaluation is low.

More specifically, in a case where the one required printing time is smaller than a predetermined threshold, the CPU 211 of the management server 200 associates the work information with evaluation information indicating that the evaluation is higher than the evaluation information to be associated in a case where the one required printing time is larger than a predetermined threshold.

Further, in a case where the one required printing time is larger than a predetermined threshold, the CPU 211 of the management server 200 associates the work information with evaluation information indicating that the evaluation is lower than the evaluation information to be associated in a case where the one required printing time is smaller than the predetermined threshold.

Here, it is desired that the above predetermined threshold to be compared with the above one required printing time is set based on the content of printing. Specifically, it is desired to set this predetermined threshold, based on, for example, the information included in the print job.

In a case where a predetermined threshold is set based on the information included in the print job, for example, the larger the man-hour required for printing is, the larger the value is, and the smaller the man-hour required for printing is, the smaller the value is. Further, the predetermined threshold becomes a larger value as the number of printed sheets increases, and becomes a smaller value as the number of printed sheets decreases.

In other words, in a case where the above predetermined threshold is set based on the information included in the print job, the predetermined threshold changes according to the information included in the print job.

In this case, the CPU 211 of the management server 200 compares one required printing time, which is the time required for printing, with the threshold set based on the content of the printing.

Then, in a case where the one required printing time is smaller than a predetermined threshold, the CPU 211 of the management server 200 associates the work information about the work performed by the worker with the evaluation information indicating that the evaluation is high.

Further, in a case where the one required printing time is larger than a predetermined threshold, the CPU 211 of the management server 200 associates the work information about the work performed by the worker with the evaluation information indicating that the evaluation is low.

Other Processing Examples

Similarly, in a case where one required work time, which is the time required for the work performed by the worker in a case of printing, is smaller than a predetermined threshold, the CPU 211 of the management server 200 may associate the work information about the work performed by the worker for the printing with the evaluation information indicating that the evaluation is high.

Further, in a case where one required work time, which is the time required for the work performed by the worker in a case of printing, is larger than a predetermined threshold, the CPU 211 of the management server 200 may associate the work information about the work performed by the worker for the printing with the evaluation information indicating that the evaluation is low.

More specifically, in this case, in a case where a required work time, which is the time required for the work performed by the worker in a case of printing, is smaller than a predetermined threshold, the CPU 211 of the management server 200 associates the work information with evaluation information indicating that the evaluation is higher than the evaluation information to be associated in a case where the required work time is larger than a predetermined threshold.

Further, in a case where a required work time, which is the time required for the work performed by the worker in a case of printing, is larger than a predetermined threshold, the CPU 211 of the management server 200 associates the work information with evaluation information indicating that the evaluation is lower than the evaluation information to be associated in a case where the required work time is smaller than a predetermined threshold.

Here, in this processing example, the CPU 211 of the management server 200 acquires work information which is information about the work performed on the printing device 100 by the worker who performs the work on the printing device 100, as in the above. Specifically, in this processing example, the CPU 211 of the management server 200 acquires information about the required work time, which is information about the worker's work time, as work information.

Then, the CPU 211 of the management server 200 determines the contents of the evaluation information to be associated with the work information, based on the information about the required work time.

Here, as in the above, it is desired to set the above predetermined threshold to be compared with the required work time, based on the contents of printing. Specifically, it is desired to set a predetermined threshold, based on the information included in the print job.

In this case, the above predetermined threshold becomes a larger value as the man-hour required for printing is larger, and becomes a smaller value as the man-hour required for printing is smaller, as in the above.

Other Processing Examples

Figure 6:
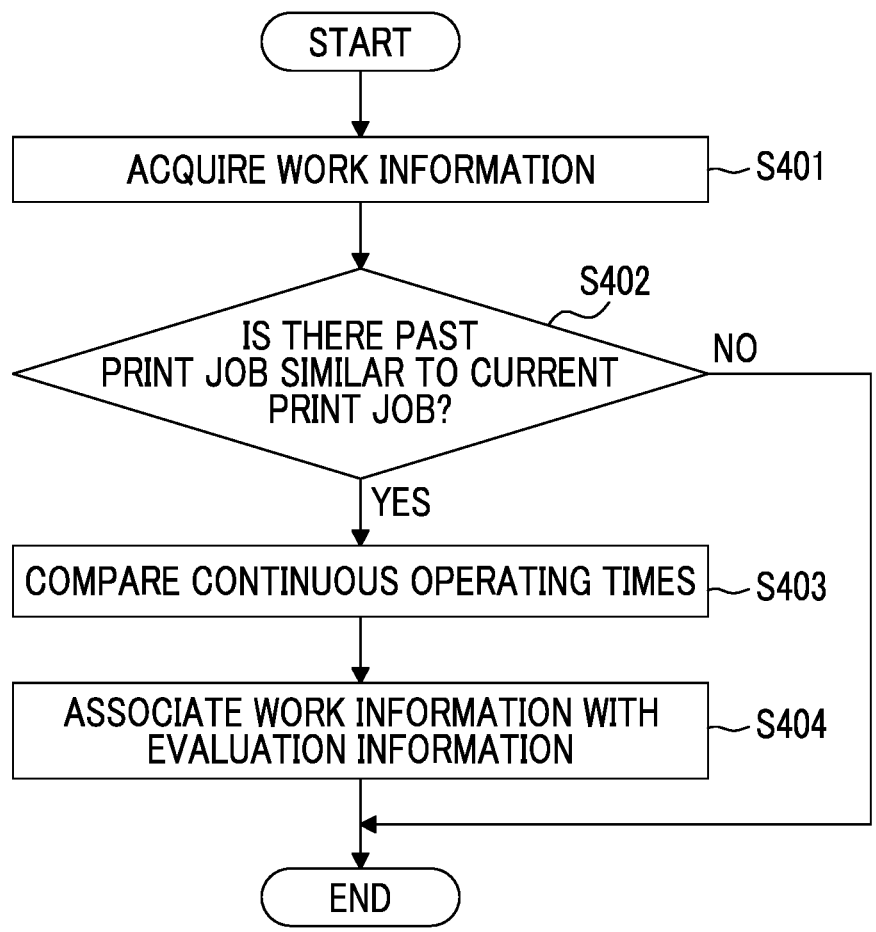
FIG. 6 is a flowchart showing an example of a flow of another process executed in the printing system.

FIG. 6 is a flowchart showing an example of a flow of another process executed in the printing system 1 of the present exemplary embodiment.

Even in this process, the worker first performs the work related to the printing to be performed. Then, the CPU 211 of the management server 200 acquires work information which is information about this work performed by the worker regarding printing (step S401).

After that, printing is performed by the printing device 100. The CPU 211 of the management server 200 acquires processing information which is information about this printing process. Specifically, as in the above, the information about the print job is acquired as the processing information.

Further, in a case where the current printing is completed, the CPU 211 of the management server 200 acquires information about the continuous operating time of the printing device 100 on which printing is performed.

Here, the "operating time" does not refer to the entire time required for printing, but to the time during which the printing device 100 has been operated.

Further, the "continuous operating time" in this processing example refers to the longest time among times during which the printing device 100 is operated in a case of executing one print job.

In this processing example, in a case where no printing trouble occurs in one print job, the continuous operating time is the operating time of the printing device 100 from the start to the end of the printing process.

Further, in a case where printing is interrupted due to a printing trouble in one print job, the continuous operating time refers to the longer time of the operating time of the printing device 100 from the start of the printing process to the occurrence of the interruption and the operating time of the printing device 100 from the restart of the printing process to the end of the printing process.

Further, in a case where printing troubles occur a plurality of times in one print job, the continuous operating time refers to the longest time among the operating time of the printing device 100 from the start of the printing process to the occurrence of the first interruption, the operating time of the printing device 100 from the restart of the printing process to the occurrence of the next interruption, and the operating time of the printing device 100 from the restart of the printing after the last interruption to the end of the printing process.

In the present exemplary embodiment, the CPU 211 of the management server 200 acquires information about the longest continuous operating time as the continuous operating time of the printing device 100 on which printing is performed.

Next, the CPU 211 of the management server 200 determines whether or not there is a past print job similar to the current print job, as in the above (step S402).

Specifically, the CPU 211 of the management server 200 determines whether or not there is a past print job similar to the current print job, based on the content of the current print job and the content of the past print job registered in the information storage device 202.

More specifically, the CPU 211 of the management server 200 determines whether or not there is a past print job having a content of which similarity with the content of the current print job exceeds a predetermined similarity.

Then, in a case where the CPU 211 of the management server 200 determines that there is a past print job similar to the current print job, the CPU 211 acquires information regarding the continuous operating time (longest continuous operating time) associated with the past print job.

Specifically, the CPU 211 of the management server 200 reads and acquires information about the longest continuous operating time associated with the past print job, from the information storage device 202.

In this processing example, the longest continuous operating time is associated with each of the past print jobs, and the past print job and the longest continuous operating time are registered in the information storage device 202 by being associated with each other.

In this processing example, every time printing is performed, the print job of this printing and the information about the longest continuous operating time in a case of printing are registered in the information storage device 202 of the management server 200 by being associated with each other.

In other words, in this processing example, every time printing is performed, the print job of this printing and the longest continuous operating time are associated, and every time printing is performed, the print job and the longest continuous operating time, which are associated, are registered in the information storage device 202.

In this processing example, in a case where the CPU 211 of the management server 200 determines that there is a past print job similar to the current print job, the CPU 211 acquires information regarding the continuous operating time (longest continuous operating time) associated with the past print job.

Specifically, the CPU 211 of the management server 200 reads and acquires information about the continuous operating time (longest continuous operating time) associated with the past print job, from the information storage device 202.

Then, the CPU 211 of the management server 200 compares the continuous operating time (longest continuous operating time) for the current printing with the continuous operating time (longest continuous operating time) for the past-printing (step S403).

Next, the CPU 211 of the management server 200 associates the evaluation information with the work information, based on the result of this comparison (step S404).

Specifically, in a case where a continuous operating time for the current printing (hereinafter referred to as "current operating time") is longer than the continuous operating time for the past-printing (hereinafter referred to as "past operating time"), the CPU 211 of the management server 200 associates evaluation information indicating that the evaluation is high with the work information about the work performed by the worker for the current printing.

More specifically, the CPU 211 of the management server 200 associates the work information with evaluation information indicating that the evaluation is higher than the evaluation information to be associated in the case where the current operating time is shorter than the past operating time.

In a case where the current operating time is longer than the past operating time, the printing device 100 has been operated for a longer time, in the current printing.

This long-time operation of the printing device 100 may be due to the work by the worker. In this case, in this processing example, evaluation information indicating that evaluation is high is associated with the work information of this work, as described above.

Further, in the case where the current operating time is shorter than the past operating time, the CPU 211 of the management server 200 associates the work information about the work performed by the worker for the current printing with evaluation information indicating that the evaluation is low.

More specifically, the CPU 211 of the management server 200 associates the work information with evaluation information indicating that the evaluation is lower than the evaluation information to be associated in the case where the current operating time is longer than the past operating time.

In a case where the current operating time is shorter than the past operating time, it is assumed that the printing device 100 is frequently stopped in the current printing.

This frequent stoppage of the printing device 100 may be due to the work by the worker. In this case, in this processing example, evaluation information indicating that evaluation is low is associated with the work information of this work, as described above.

In this processing example, the similarity between the content of the pre-printing and the content of the post-printing exceeds the predetermined similarity, and the continuous operating time in the post-printing is longer than the continuous operating time in the pre-printing, the work information about the work performed by the worker for the post-printing is associated with the evaluation information indicating that evaluation is high.

Further, in this processing example, the similarity between the content of the pre-printing and the content of the post-printing exceeds the predetermined similarity, and the continuous operating time in the post-printing is shorter than the continuous operating time in the pre-printing, the work information about the work performed by the worker for the post-printing is associated with the evaluation information indicating that evaluation is low.

Here, in this processing example, the case where the evaluation information is associated with the work information about the work performed by the worker for post-printing, based on the continuous operating time has been described.

Without being limited to this, as in the above, the evaluation information may be associated with the work information about the work performed by the worker for the pre-printing, based on the continuous operating time.

In this case, in a case where the continuous operating time in the post-printing is longer than the continuous operating time in the pre-printing, evaluation information indicating that the evaluation is low is associated with the work information about the work performed by the worker for pre-printing.

In a case where the continuous operating time in the post-printing is shorter than the continuous operating time in the pre-printing, evaluation information indicating that the evaluation is high is associated with the work information about the work performed by the worker for pre-printing.

Other Processing Examples

Further, as another processing example, in a case where the CPU 211 of the management server 200 acquires information about the continuous operating time of the printing device 100, the CPU 211 may determine the content of the evaluation information to be associated with the work information, depending on whether or not the acquired continuous operating time exceeds a predetermined time.

The "continuous operating time" here is not the longest continuous operating time for one print job described above, but refers to the time during which the printing device 100 is continuously operated without any unintended printing interruption in the printing device 100.

In other words, the "continuous operating time" here refers to the operating time of the printing device 100 from the restart of printing after an unintended printing interruption to the occurrence of the next unintended printing interruption.

In this case, for example, in a case where a plurality of print jobs are continuously executed without causing a printing trouble in the printing device 100, the continuous operating time gradually increases.

Further, in this case, for example, in a case where a plurality of print jobs are continuously executed and an unintended printing interruption occurs in the printing device 100, the operating time of the printing device 100 from the start of the first job of the plurality of print jobs to the occurrence of this interruption is the continuous operating time.

In this processing example, for example, in a case where the continuous operating time exceeds a predetermined time, the CPU 211 of the management server 200 associates each piece of the work information about the work performed by the worker for the printing performed within the continuous operating time with evaluation information indicating that the evaluation is lower than the evaluation information to be associated in a case where the predetermined time is not exceeded.

Here, in the printing device 100, in a case where printing trouble does not occur, printing by print jobs is sequentially performed without unintended process interruption of processing, and printing by a plurality of print jobs is performed sequentially without unintended interruption of processing.

In this processing example, in a case where one continuous operating time, which is the time during which the printing device 100 is continuously operated without causing a printing trouble, exceeds a predetermined time (threshold), each piece of the work information about the work performed by the worker for the printing performed within the one continuous operating time with evaluation information indicating that the evaluation is higher than the evaluation information to be associated in a case where the predetermined time is not exceeded.

Specifically, in a case where a plurality of print jobs are executed within one continuous operating time and the one continuous operating time exceeds a predetermined time, each piece of the work information corresponding to each of the plurality of print jobs is associated with evaluation information indicating that the evaluation is higher than the evaluation information to be associated in a case where the predetermined time is exceeded.

On the other hand, in this processing example, in a case where one continuous operating time does not exceed a predetermined time, each piece of the work information corresponding to each of the print jobs executed within this one continuous operating time is associated with evaluation information indicating that the evaluation is lower than the evaluation information to be associated in a case where the predetermined time is exceeded.

In a case where one continuous operating time exceeds a predetermined threshold, it is assumed that the worker's work corresponding to each of the print jobs executed within this one continuous operating time was good. In this case, in this processing example, evaluation information indicating that the evaluation is high is associated with the work information corresponding to each of the works.

On the other hand, in a case where one continuous operating time does not exceed a predetermined threshold, it is considered that the worker's work corresponding to each of the print jobs executed within this one continuous operating time is not good. In this case, in this processing example, evaluation information indicating that the evaluation is low is associated with the work information corresponding to each of the works.

Other Processing Examples

Figure 7:
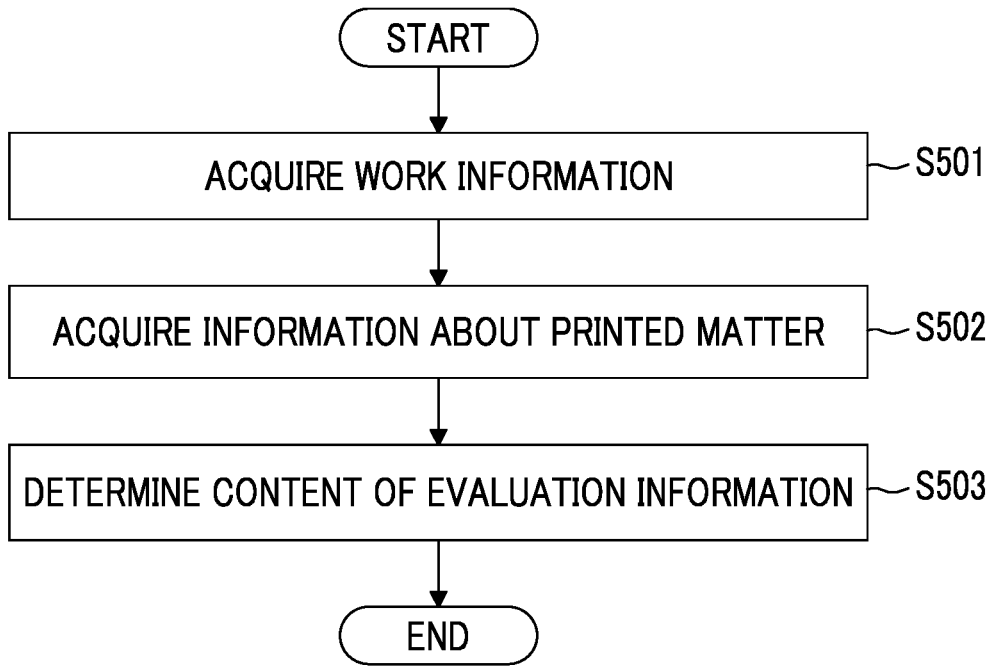
FIG. 7 is a flowchart showing an example of a flow of another process executed in the printing system.

FIG. 7 is a flowchart showing an example of a flow of another process executed in the printing system 1 of the present exemplary embodiment.

Even in this processing example, the worker first performs the work related to printing. Then, even in this processing example, the CPU 211 of the management server 200 acquires work information which is information about this work performed by the worker regarding printing (step S501).

After that, printing is performed by the printing device 100. The CPU 211 of the management server 200 acquires processing information which is information about this printing process. Specifically, in this processing example, as processing information, information about a printed matter which is an output obtained by this printing process is acquired (step S502).

Specifically, the CPU 211 of the management server 200 acquires the inspection result of the printed matter by the inspection device 400 (see FIG. 1), as the information about the printed matter. In the present exemplary embodiment, the case of acquiring the inspection result by the inspection device 400 will be described as an example, but the present invention is not limited to this, and the manual inspection results may be acquired.

The CPU 211 of the management server 200 determines the content of the evaluation information to be associated with the work information which is the information about the work performed by the worker regarding the current printing, based on the acquired information about the printed matter (step S503).

In other words, the CPU 211 of the management server 200 determines the content of the evaluation information to be associated with the work information which is the information about the work performed by the worker regarding the current printing, based on the result of the inspection on the printed matter.

Specifically, for example, in a case where the state of the printed matter, specified by the acquired information about the printed matter, is better than the predetermined state, the CPU 211 of the management server 200 associates evaluation information indicating that the evaluation is high.

Specifically, in a case where the state of the printed matter is better than the predetermined state, the CPU 211 of the management server 200 associates the work information about the work performed by the worker regarding the current printing with evaluation information indicating that the evaluation is higher than the evaluation information to be associated in a case where the state of the printed matter is worse than the predetermined state.

More specifically, in a case where, for example, the printing defect rate obtained by the inspection device 400 is smaller than a predetermined threshold, the CPU 211 of the management server 200 associates the work information with the evaluation information indicating that the evaluation is higher than the evaluation information to be associated in a case where the print defect rate is larger than the predetermined threshold.

On the other hand, in a case where the state of the printed matter specified by the acquired information about the printed matter is worse than the predetermined state, the CPU 211 of the management server 200 associates evaluation information indicating that the evaluation is low.

Specifically, in a case where the state of the printed matter is worse than the predetermined state, the CPU 211 of the management server 200 associates the work information about the work performed by the worker regarding the current printing with evaluation information indicating that the evaluation is lower than the evaluation information to be associated in a case where the state of the printed matter is better than the predetermined state.

More specifically, in a case where, for example, the printing defect rate obtained by the inspection device 400 is larger than a predetermined threshold, the CPU 211 of the management server 200 associates the work information with the evaluation information indicating that the evaluation is lower than the evaluation information to be associated in a case where the print defect rate is smaller than the predetermined threshold.

In a case where the worker's work is not good, the effects of this work may appear on the printed matter.

Specifically, for example, in some cases, a color shift may occur in an image formed on a printed matter, a shift may occur in the formation position of the image, or the color of the image may become different from the original color.

In the present exemplary embodiment, in a case where such a situation occurs in printing, information indicating that the evaluation is low is associated with the work information about the worker who has performed the work related to this printing. More specifically, information indicating that the evaluation is lower than the evaluation information to be associated in a case where such a situation does not occur is associated.

Figure 8:
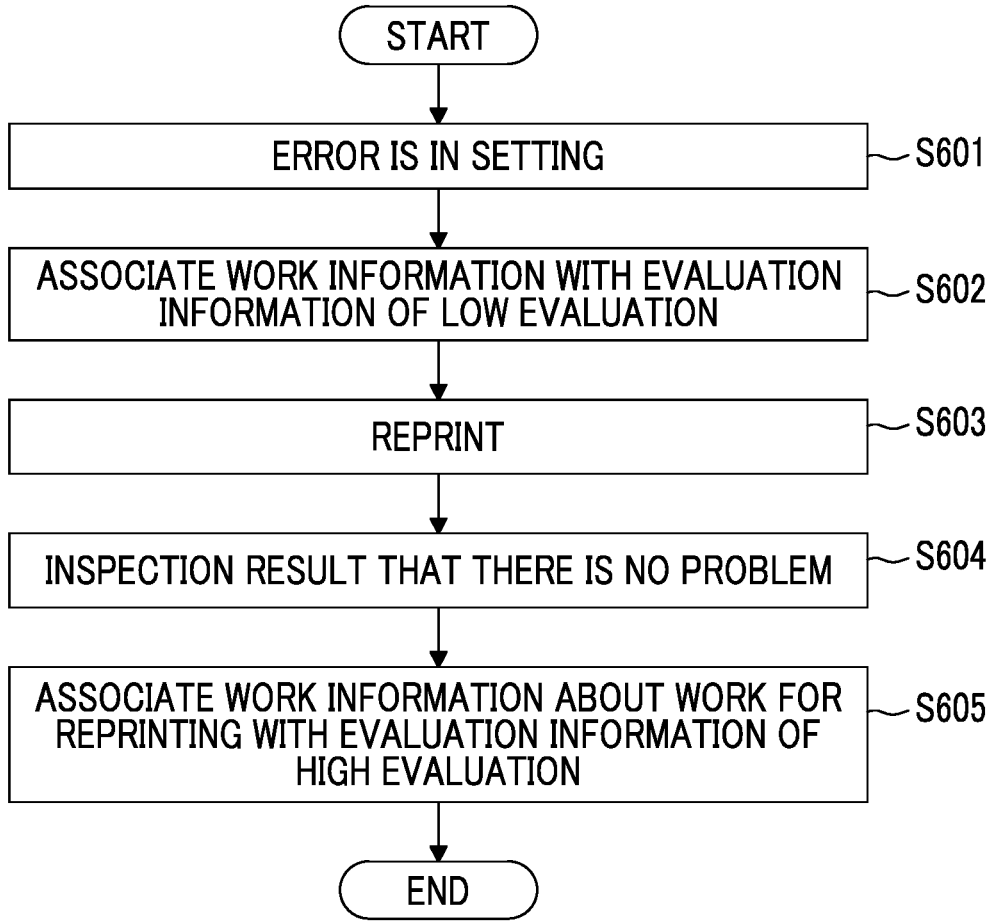
FIG. 8 is a diagram showing another example of a process.

FIG. 8 is a diagram showing another example of a process.

This processing example illustrates a case where an error is found in the setting for printing by the inspection by the inspection device 400 (step S601).

In this case, in this processing example, information indicating that the evaluation is low is associated with the work information about the work performed by the worker in this printing (step S602).

Next, in this processing example, reprinting is performed (step S603).

In this reprinting, the worker performs the work for reprinting. In this processing example, the CPU 211 of the management server 200 acquires work information about the work for reprinting. The CPU 211 of the management server 200 acquires the work information about the work for reprinting, in the same method as the method in the case of acquiring the work information described above.

Next, in this processing example, the inspection result that there is no problem in the inspection by the inspection device 400 is output (step S604).

In this case, the CPU 211 of the management server 200 associates the work information about the work for reprinting with the information indicating that the evaluation is high (step S605).

Other Processing Examples

Figure 9:
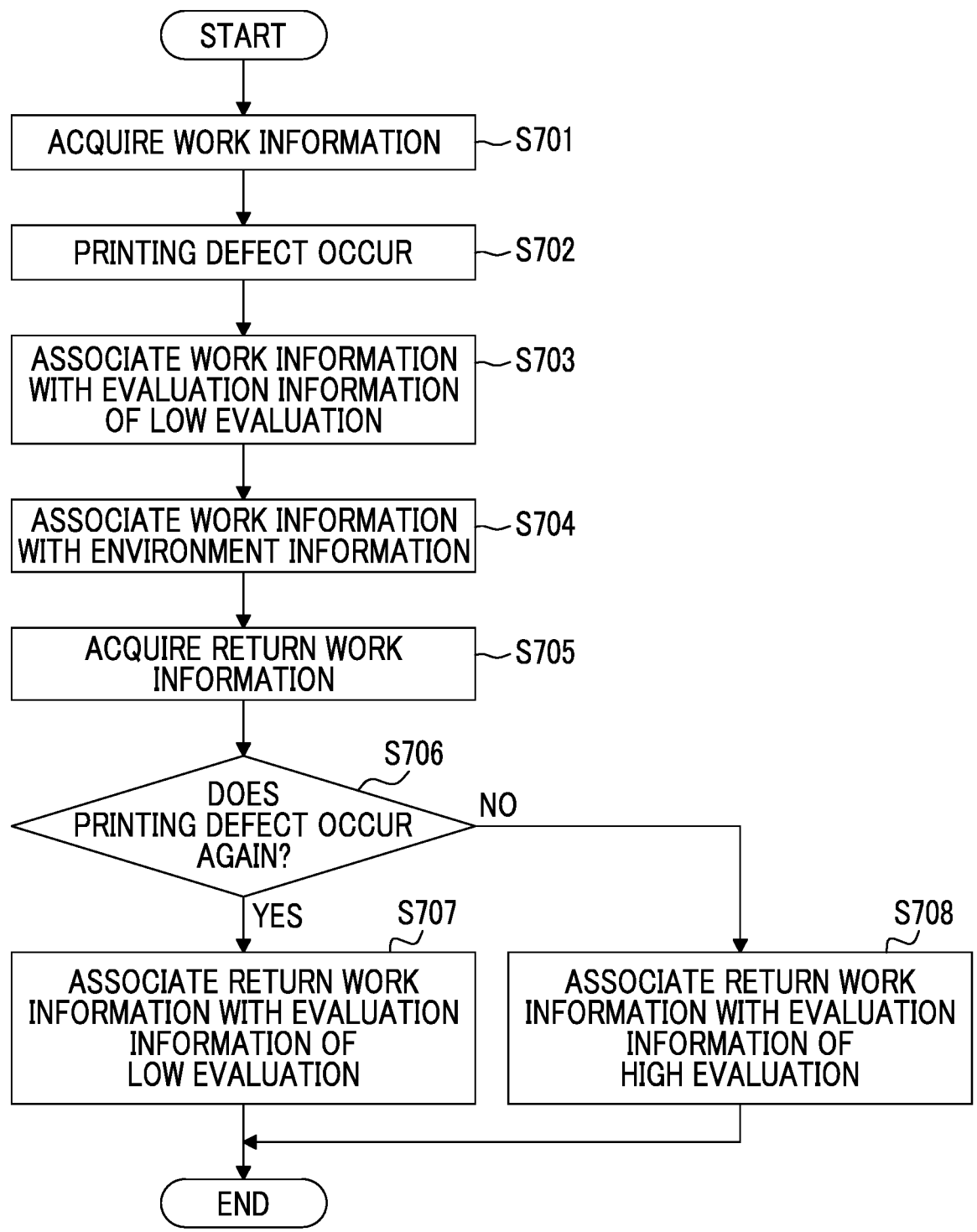
FIG. 9 is a flowchart showing an example of a flow of another process executed in the printing system.

FIG. 9 is a flowchart showing an example of a flow of another process executed in the printing system 1 of the present exemplary embodiment.

Even in this processing example, the worker first performs the work related to printing. Then, even in this processing example, the CPU 211 of the management server 200 acquires work information which is information about this work performed by the worker regarding printing (step S701).

After that, the printing process is started. Then, in this processing example, a printing defect such as a paper jam occurs (step S702).

In this case, the CPU 211 of the management server 200 acquires, as the processing information, information indicating that a processing defect in printing (hereinafter, referred to as "printing defect") has occurred.

Then, in this case, the CPU 211 of the management server 200 associates the work information about the work performed by the worker regarding the printing with the evaluation information indicating that the evaluation is low (step S703).

Specifically, the CPU 211 of the management server 200 associates the work information with evaluation information indicating that the evaluation is lower than the evaluation information associated with the case where no printing defect occurs.

Further, in this processing example, the CPU 211 of the management server 200 associates this work information with evaluation information indicating that the evaluation is low and environment information which is information about the environment in a case where the current printing is performed (step S704).

Specifically, the CPU 211 of the management server 200 associates the work information with information such as temperature and humidity. In other words, the CPU 211 of the management server 200 associates the work information with information about the atmosphere around the printing device 100 in a case where the current printing is performed.

More specifically, the CPU 211 of the management server 200 associates the work information with the information on the temperature and humidity inside the printing device 100 and the information on the temperature and humidity of the room in which the printing device 100 is installed.

After that, in this processing example, the worker performs a return work, which is work for returning the printing device 100.

Then, the CPU 211 of the management server 200 acquires information about the return work (hereinafter, referred to as "return work information") (step S705).

In the present exemplary embodiment, the CPU 211 of the management server 200 acquires the return work information, in the same method as the method in the case of acquiring the above work information.

Then, in this processing example, reprinting is performed by the printing device 100.

Next, in this processing example, the CPU 211 of the management server 200 determines whether or not a printing defect occurs again (step S706).

Then, in a case where a printing defect occurs again, the CPU 211 of the management server 200 associates the return work information with the evaluation information indicating that the evaluation is low (step S707).

More specifically, the CPU 211 of the management server 200 associates the return work information with evaluation information indicating that the evaluation is lower than the evaluation information to be associated in the case where no printing defect occurs.

On the other hand, in a case where it is not determined in step S706 that a printing defect has occurred again, the process proceeds to step S708.

In the process of step S708, the CPU 211 of the management server 200 associates the return work information with the evaluation information indicating that the evaluation is high.

Specifically, the CPU 211 of the management server 200 associates the return work information with evaluation information indicating that the evaluation is higher than the evaluation information to be associated in the case where a printing defect occurs.

Other Processing Examples

Figure 10:
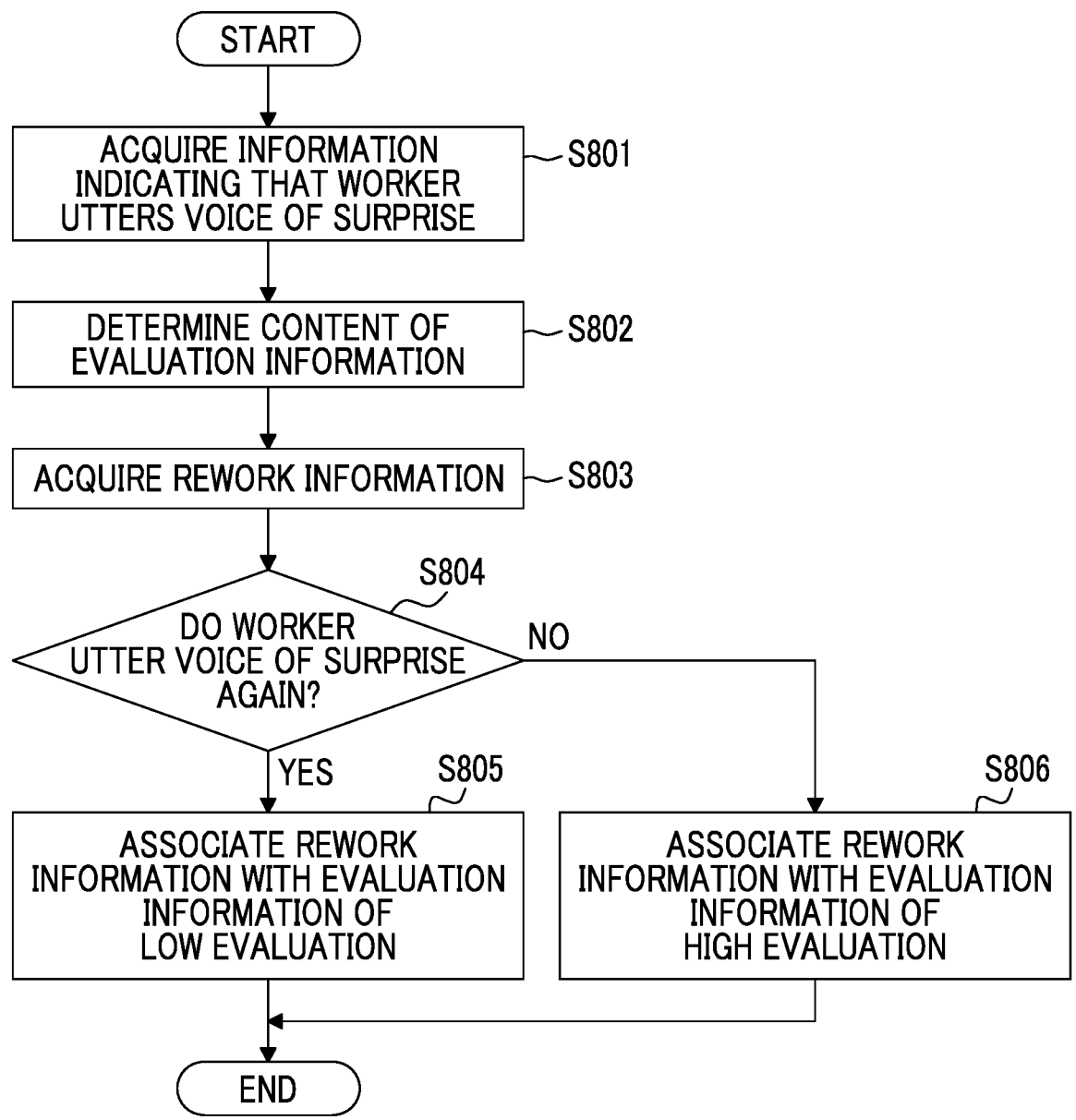
FIG. 10 is a flowchart showing an example of a flow of another process executed in the printing system.

FIG. 10 is a flowchart showing an example of a flow of another process executed in the printing system 1 of the present exemplary embodiment.

Even in this processing example, the worker first performs the work related to printing. Then, in this processing example, a case where the worker utters a voice of surprise during this work is illustrated. In other words, the example exemplifies that there was an utterance of the worker.

In this case, the CPU 211 of the management server 200 acquires information indicating that the worker utters a voice of surprise (step S801).

More specifically, the CPU 211 of the management server 200 obtains the output from the microphone attached to the worker, and acquires the information indicating that the worker utters a voice of surprise. In other words, the CPU 211 of the management server 200 acquires utterance information, which is information indicating that the worker has uttered.

In other words, in this case, the CPU 211 of the management server 200 acquires the biological information of the worker who is an example of the person involved in printing.

Here, "biological information" is information emitted by the body of a target person, and includes not only information directly obtained from this body such as body temperature, but also information such as sounds emitted by the movement of this body.

In this processing example, the CPU 211 of the management server 200 determines the content of evaluation information, which is the information about the evaluation of the work performed by the worker regarding printing, based on the acquired biological information (step S802). Then, the CPU 211 of the management server 200 associates the determined evaluation information with the work information, as in the above.

In a case where the CPU 211 of the management server 200 acquires, as biological information, information indicating that the worker utters a voice of surprise, as described above, the CPU 211 associates the work information with evaluation information indicating that the evaluation is low.

More specifically, the CPU 211 of the management server 200 associates the work information with evaluation information indicating that the evaluation is lower than the evaluation information to be associated in the case where the information indicating that a voice of surprise is uttered has not been acquired.

On the other hand, in a case where the CPU 211 of the management server 200 does not acquire information indicating that the worker utters a voice of surprise, the CPU 211 associates the work information with evaluation information indicating that the evaluation is higher than the evaluation information to be associated in the case where the information indicating that a voice of surprise is not uttered has been acquired.

The CPU 211 of the management server 200 determines whether or not the worker utters a voice of surprise, based on, for example, the sound pressure of the voice acquired by the microphone. Specifically, the CPU 211 of the management server 200 determines that the worker utters a voice of surprise, in a case where the sound pressure of the voice acquired by the microphone exceeds a predetermined threshold.

Further, for example, the CPU 211 of the management server 200 may determine that the worker utters a voice of surprise, in a case where the worker utters a predetermined word of a registered specific word.

After that, this processing example illustrates a case where the work is redone. In this case, the CPU 211 of the management server 200 acquires information about the redone work (hereinafter, "rework information") (step S803).

Then, in the present exemplary embodiment, the CPU 211 of the management server 200 determines whether or not the worker utters a voice of surprise again (step S804). In other words, the CPU 211 of the management server 200 determines whether the detection of the specific biological information has been performed again.

Then, in a case where the CPU 211 of the management server 200 determines that the worker utters a voice of surprise again, the CPU 211 associates the rework information with evaluation information indicating that the evaluation is lower than the evaluation information to be associated in the case where a voice of surprise is not uttered again (step S805).

On the other hand, in a case where the CPU 211 of the management server 200 does not determine that the worker utters a voice of surprise again, the CPU 211 associates the rework information with evaluation information indicating that the evaluation is higher than the evaluation information to be associated in the case where a voice of surprise is uttered again (step S806).

In the above, the case where the utterance information is acquired as the biological information has been described as an example, but the biological information is not limited to the utterance information.

Other examples of biological information include information on heart rate, information on pulse, information on blood pressure, and information on sweating.

In this case, for example, in a case where the values for heart rate, pulse, blood pressure, and sweating exceed predetermined thresholds, the work information and the rework information are associated with evaluation information indicating that the evaluation is low.

On the other hand, in a case where the values for heart rate, pulse, blood pressure, and sweating do not exceed predetermined thresholds, the work information and the rework information are associated with evaluation information indicating that the evaluation is higher than a case where the values exceed the predetermined thresholds.

Further, in the above, the content of the evaluation information to be associated with the worker's work information is determined based on the worker's biological information, but without being limited to this, the content of the evaluation information to be associated with the worker's work information may be determined based on the biological information of a person other than the worker.

Specifically, for example, the content of the evaluation information to be associated with the work information of the worker may be determined based on the biological information of the inspector who inspects the printed matter and the biological information of the supervisor who supervises the worker.

Since the utterance of a voice of surprise and the increase in the value of the pulse or the like also occur in the inspector and the supervisor, the contents of the evaluation information to be associated with the work information of the worker may be determined, based on the biological information of the inspector and the supervisor.

More specifically, the inspector and the supervisor are also persons involved in printing, and it is assumed that the inspector and the supervisor utter a voice of surprise or the values such as the pulse rise, in a case where the inspector and the supervisor see the printed matter.

In a case where there was an utterance of a voice of surprise and an increase in the value of the pulse or the like, the evaluation information indicating that the evaluation is low is associated with the work information of the worker.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
    a sensor, configured to detect operation information of an operator who operates a printer that performs a printing process on a recording medium, wherein the operator performs a process of preparing for printing to be performed; and
    a processor configured to:
        acquire the operation information from the sensor;
        acquire processing information about the printing process;
        determine a content of evaluation information about evaluation of the operation based on the acquired processing information; and
        associate the operation information of the operator and the evaluation information of the operation.

2. The information processing system according to claim 1, wherein
    the processor is configured to:
    acquire, as the processing information, information about a first printing process performed earlier and information about a second printing process performed after the first printing process, and
    determine a content of evaluation information to be associated with operation information about an operation performed by the operator for the first printing process, based on the information about the first printing process and the information about the second printing process.

3. The information processing system according to claim 2, wherein the processor is configured to:
    determine the content of the evaluation information to be associated with the operation information about an operation performed by the operator for the first printing process, based on a similarity between a content of the first printing process and a content of the second printing process.

4. The information processing system according to claim 3, wherein the processor is configured to:
    in a case where the similarity exceeds a predetermined similarity, associate the operation information about the operation performed by the operator for the first printing process with evaluation information indicating that evaluation is lower than evaluation information to be associated in a case where the similarity does not exceed the predetermined similarity.

5. The information processing system according to claim 1, wherein the processor is configured to:
    acquire, as the processing information, information about a time required for a first printing process that is a process performed earlier and information about a time required for a second printing process that is a process performed later, and
    determine a content of evaluation information to be associated with operation information about an operation performed by the operator for the second printing process, based on the information about the time required for the first printing process and the information about the time required for the second printing process.

6. The information processing system according to claim 5, wherein the processor is configured to:

in a case where a second printing process required time that is a time required for the second printing process is longer than a first printing process required time that is a time required for the first printing process, associate the operation information about the operation performed by the operator for the second printing process with evaluation information indicating that evaluation is lower than evaluation information to be associated in a case where the second printing process required time is shorter.

7. The information processing system according to claim 6, wherein the processor is configured to:
in a case where a similarity between the content of the first printing process and the content of the second printing process exceeds a predetermined similarity, and the second printing process required time is longer than the first printing process required time, associate the operation information about the operation performed by the operator for the second printing process with the evaluation information indicating that evaluation is low.

8. The information processing system according to claim 1, wherein the processor is configured to:
acquire, as the processing information, information about a time required for the printing process, and
in a case where a required time, that is the time required for the printing process, is smaller than a predetermined threshold,
associate operation information about an operation performed by the operator for the printing process with evaluation information indicating that evaluation is higher than evaluation information to be associated in a case where the required time is larger than the predetermined threshold.

9. The information processing system according to claim 8, wherein the processor is configured to:
in a case where the required time, that is the time required for the printing process, is smaller than a threshold set based on a content of the printing process, associate the operation information about an operation performed by the operator for the printing process with evaluation information indicating that the evaluation is high.

10. The information processing system according to claim 1, wherein
the processor is configured to:
acquire, as the processing information, information about a continuous operating time of a printer used for a first printing process that is performed earlier and information about a continuous operating time of a printer used for a second printing process that is performed later, and
determine a content of evaluation information to be associated with operation information about an operation performed by the operator for the second printing process, based on the continuous operating time of the printer used for the first printing process and the continuous operating time of the printer used for the second printing process.

11. The information processing system according to claim 10, wherein the processor is configured to:
in a case where a second continuous operating time, that is the continuous operating time of the printer used for the second printing process, is longer than a first continuous operating time, that is the continuous operating time of the printer used for the first printing process, associate operation information about an operation performed by the operator for the second printing process with evaluation information indicating that evaluation is higher than evaluation information to be associated in a case where the second continuous operating time is shorter.

12. The information processing system according to claim 11, wherein the processor is configured to:
in a case where a similarity between a content of the first printing process and a content of the second printing process exceeds a predetermined similarity, and the second continuous operating time is longer than the first continuous operating time, associate the operation information about the operation performed by the operator for the second printing process with the evaluation information indicating that evaluation is high.

13. The information processing system according to claim 1, wherein the processor is configured to:
acquire, as the processing information, information about a continuous operating time of the printer used for the printing process, and
in a case where the continuous operating time exceeds a predetermined time, associate operation information about an operation performed by the operator for the printing process within the continuous operating time with evaluation information indicating that evaluation is higher than evaluation information to be associated in a case where the continuous operating time does not exceed the predetermined time.

14. The information processing system according to claim 1, wherein the processor is configured to:
acquire, as the processing information, information about an output obtained by the printing process, and
determine, based on the acquired information about the output, a content of the evaluation information to be associated with the operation information, that is information about an operation performed by the operator regarding the printing process.

15. The information processing system according to claim 14, wherein the processor is configured to:
in a case where a state of the output, that is specified by the acquired information about the output, is better than a predetermined state, associate the operation information about the operation performed by the operator regarding the process with evaluation information indicating that evaluation is higher than evaluation information to be associated in a case where the state is worse than the specified state.

16. The information processing system according to claim 1, wherein the processor is configured to:
in a case where information indicating that a processing defect has occurred is acquired as the processing information, associate the operation information about the operation performed by the operator regarding the process with evaluation information indicating that the evaluation is lower than the evaluation information to be associated in a case where no defect occurs in the process.

17. The information processing system according to claim 16, wherein a processor configured to:
associate the operation information with evaluation information indicating that the evaluation is low and environment information that is information about environment in a case where the process is performed.

18. An information processing system comprising:
a sensor, configured to detect operation information of an operator who operates a printer that performs a printing process on a recording medium, wherein the operator performs a process of preparing for printing to be performed; and a processor configured to:
  acquire the operation information from the sensor;
  determine a content of evaluation information about evaluation of the operation based on the acquired work information; and
  associate the operation information of the operator and the evaluation information of the operation.

19. The information processing system according to claim 18, wherein the processor is configured to:
  acquire, as the operation information, information about operation time of the operator, and
  determine, based on the information about the operation time, a content of the evaluation information to be associated with the operation information.

20. A non-transitory computer readable medium storing a program causing a computer to execute:
  detecting operation information of an operator who operates a printer that performs a printing process on a recording medium by using a sensor, wherein the operator performs a process of preparing for printing to be performed;
  acquiring processing information about the printing process; and
  determining a content of evaluation information about evaluation of the operation based on the acquired processing information; and
  associating the operation information of the operator and the evaluation information of the operation.

* * * * *